(12) United States Patent
Drouot

(10) Patent No.: US 9,602,708 B2
(45) Date of Patent: Mar. 21, 2017

(54) RECTIFIED STEREOSCOPIC 3D PANORAMIC PICTURE

(71) Applicant: ST-Ericsson SA, En Liquidation, Plan-les-Ouates (CH)

(72) Inventor: Antoine Drouot, Paris (FR)

(73) Assignee: Optis Circuit Technology, LLC, Plano, TX (US)

( * ) Notice: Subject to any disclaimer, the term of this patent is extended or adjusted under 35 U.S.C. 154(b) by 356 days.

(21) Appl. No.: 14/356,698

(22) PCT Filed: Oct. 23, 2012

(86) PCT No.: PCT/EP2012/070988
§ 371 (c)(1),
(2) Date: May 7, 2014

(87) PCT Pub. No.: WO2013/072166
PCT Pub. Date: May 23, 2013

(65) Prior Publication Data
US 2014/0327745 A1    Nov. 6, 2014

Related U.S. Application Data

(60) Provisional application No. 61/564,570, filed on Nov. 29, 2011.

(30) Foreign Application Priority Data

Nov. 15, 2011    (EP) .................................... 11306496

(51) Int. Cl.
*H04N 5/225*        (2006.01)
*H04N 13/02*       (2006.01)
(Continued)

(52) U.S. Cl.
CPC ......... *H04N 5/2259* (2013.01); *G06T 3/4038* (2013.01); *H04N 9/76* (2013.01); *H04N 13/0203* (2013.01); *H04N 13/0221* (2013.01)

(58) Field of Classification Search
None
See application file for complete search history.

(56) References Cited

U.S. PATENT DOCUMENTS

2002/0054211 A1* 5/2002 Edelson ................ G06T 7/0042
                                                         348/169
2005/0206743 A1* 9/2005 Sim .................... H04N 5/23238
                                                         348/218.1
(Continued)

FOREIGN PATENT DOCUMENTS

EP         2 339 863 A2     6/2011
JP         2011135459 A     7/2011

OTHER PUBLICATIONS

International Search Report issued in corresponding International application No. PCT/EP2012/070988, mailing date Jan. 9, 2013.
(Continued)

*Primary Examiner* — Frederick Bailey
(74) *Attorney, Agent, or Firm* — Spencer C. Patterson; Grable Martin Fulton PLLC

(57) ABSTRACT

A method of generating first and second panoramic pictures based on a series of frames acquired by a frame acquisition device is provided. While the device is panned in a main direction, a global motion value reflecting a displacement in the main direction between consecutive frames and a perspective transform reflecting a perspective change between the frames are computed. For each frame, a first area of the frame is determined for the first panoramic picture and a second area of the frame, distinct from the first area, is determined for the second panoramic picture. An adapted first area is determined by applying an inverse of the global
(Continued)

transform to the first area of the current frame, the adapted first area being included into the first panoramic picture and the second area of the current frame being included into the second panoramic picture.

11 Claims, 6 Drawing Sheets

(51) Int. Cl.
 *G06T 3/40* (2006.01)
 *H04N 9/76* (2006.01)

(56) References Cited

U.S. PATENT DOCUMENTS

| | | | |
|---|---|---|---|
| 2008/0266142 A1* | 10/2008 | Sula | G01C 21/3647 340/995.17 |
| 2009/0021576 A1* | 1/2009 | Linder | G03B 37/00 348/36 |
| 2009/0022422 A1* | 1/2009 | Sorek | G06T 3/4038 382/284 |
| 2009/0219401 A1* | 9/2009 | Drouot | H04N 5/23254 348/208.4 |
| 2009/0244265 A1* | 10/2009 | Ishiyama | H04N 13/0282 348/50 |
| 2010/0194851 A1* | 8/2010 | Pasupaleti | H04N 1/3876 348/36 |
| 2011/0085027 A1 | 4/2011 | Yamashita et al. | |
| 2011/0193941 A1 | 8/2011 | Inaba et al. | |
| 2013/0070108 A1* | 3/2013 | Aerts | G06T 7/002 348/187 |

OTHER PUBLICATIONS

Written Opinion of the International Searching Authority issued in corresponding International application No. PCT/EP2012/070988, mailing date Jan. 9, 2013.

* cited by examiner

RECTIFIED STEREOSCOPIC 3D PANORAMIC PICTURE

BACKGROUND

Technical Field

The present invention generally relates to digital frame processing and in particular to panoramic frame processing.

It finds application in particular, while not exclusively, in picture acquisition devices and in particular, while not exclusively, in single lens devices.

Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Panoramic pictures or mosaics are larger images formed by assembling smaller still or video frames according to a single given direction (e.g. left to right) imposed by the movement of the camera that captured the sequence of frames. The sequence of frames can be acquired by a camera that is rotated (panned for example) around a given axis and in a given sense (for example clockwise or counter clockwise). For the sake of simplification, we consider that the camera is panned in a main direction.

Typically, a current frame is superimposed on the preceding frame in the sequence. Hence, a mix area of the current image typically corresponds to a common part between the current and one or more of the preceding frames. Also, a copy area of the current frame corresponds to a part of the current frame that is not common with any of the preceding frames and will complete the preceding frame for forming the panoramic picture.

The definition of the mix and copy areas thus comprises dividing the current frame into two parts (the mix area being the left part and the copy area being the right part, in case of a left to right movement of the camera).

The superimposition of the current frame on the preceding frame is performed by analysis of all the pixels of each frame, or by analysis of the movement of the camera.

Once the current frame has been superimposed on the preceding frame, the pixels of the current frame in the mix area are typically mixed or blended with the pixels of the preceding frame that are in the mix area of the current frame, and the copy area is added to the preceding frame to complete the panoramic picture comprising the previous frame.

Thus, a mosaic or a panoramic picture is obtained from a plurality of frames obtained from different point of views, as the camera acquiring the frames is panned.

This method can also be used to create stereoscopic panoramic pictures from a single video. This is done by generating at least two panoramic pictures, which can for example correspond to left and right views with a different positioning of the mix and copy areas.

As the camera is panned, the perspective is different in each frame of the recorded video. When a single panoramic picture is computed, the perspective differences are not a problem as the perspective differences between successive frames can be small enough to be mapped on a planar manifold. However, the different perspectives are problematic when several panoramic pictures are created, for stereoscopic panoramic pictures for example. Indeed, a given copy area for the left view in a first frame corresponds to a copy area for the right view in a second frame, which has a perspective that significantly differs from the perspective of the first frame. In addition to the perspective differences due to the rotation of the camera and which is present even in an ideal case, other perspective differences can be due to the fact that the camera motion is unrestricted in the case of a hand-held camera, and therefore that pitch and roll (rotations around the other axes) of the camera can vary significantly between each frame.

The result of perspective differences is that a final stereoscopic image, obtained based on the two panoramic pictures, will look distorted, unnatural, and the depth effect may be difficult to perceive, thus creating eye fatigue for a viewer.

Thus, there is a need to enable computing a non distorted stereoscopic image from at least two panoramic pictures acquired with a single frame acquisition device.

SUMMARY OF THE INVENTION

To address these needs, a first aspect of the present invention relates to a method of generating at least a first panoramic picture and a second panoramic picture based on a series of frames acquired by one frame acquisition device while the device is panned in a main direction, a global motion value and a perspective transform being computed for each pair of consecutive frames of the series, the global motion value reflecting a displacement in the desired direction between the frames of a pair of frames and the perspective transform reflecting a perspective change between the frames of a pair of frames. For each frame of the series, a first area of the frame is determined for the first panoramic picture and a second area of the frame, distinct from the first area, is determined for the second panoramic picture. The method comprises, upon acquisition of a current frame of the series of frames:

determining a first frame among the already acquired frames of the series of frames, which has a second area that shares at least a common area with the first area of the current frame;

calculating a global transform based on the perspective transforms of the pairs of consecutive frames that have been acquired between the first frame and the current frame;

determining an adapted first area by applying an inverse of the global transform to the first area of the current frame, the adapted first area being included into the first panoramic picture and the second area of the current frame being included into the second panoramic picture.

By "main direction", it is meant a direction of movement in which a user tries to pan his frame acquisition device, such as a camera for example. However, as previously explained, because the camera can be hand-held, some pitch and roll movements can add to the moving of the device in the main direction, which are not in the main direction.

Therefore, the present invention enables to compensate for the differences of perspective between common scenes of different panoramic pictures. Indeed, upon acquisition of a current frame, the method determines a first frame among the already acquired frames for which the second area has a common area with the first area of the current frame. The difference of perspective is then evaluated between the first frame and the current frame in order to compensate it by applying a global transform. This results in an improvement in obtaining a final stereoscopic image based on the first and second panoramic pictures, which is non distorted, natural and does not cause eye fatigue.

According to some embodiments, the first and second areas are respectively a first strip and a second strip that are extending in a direction perpendicular to the main direction, centres of the first and second strips being located at constant positions in the frames and being separated by a constant distance from one frame to the other.

Thus, first and second areas are relevant areas that are representative of the different point of views which are necessary to generate a stereoscopic panorama.

In complement, the method comprises, before determining the first frame, comparing a sum of the global motion values of the pairs of consecutive frames of the series of frames with the constant distance. The step of determining the first frame is performed if the sum of the global motion values is greater than the constant distance.

Thus, the comparison step enables to avoid trying to determine a first frame that does not exist yet as the camera has not been panned on a sufficient distance. This enables to enhance the efficiency of the initialization of the method.

Alternatively or in complement, if the sum of the global motion values is lower than the constant distance, then the first strip of the current frame can be included into the first panoramic picture and the second strip of the current frame can be included into the second panoramic picture, and the method can further comprise acquiring at least one new frame, the new frame being added to the series to form a new series of frames, and calculating a new global motion value between the current frame and the new frame to repeat the step of comparing a sum of the global motion values for each pair of consecutive frames of the new series with the constant distance.

Such embodiments enable to avoid losing information during initialization of the method. Indeed, at the beginning of the method, it is possible that a first frame can not be determined. Then, the strips can nevertheless be added to the panoramic pictures, without applying a global transform.

Alternatively or in complement, a width of the first and second strips of a given frame can be proportional to the global motion value of the pair of frames comprised of the given frame and the previous frame acquired before the given frame.

In some embodiments, the first frame is determined as being the frame of index p for which the absolute value of the following expression is minimized:

$$(\Sigma_{i \in [p+1;k]} GMV_i) - d$$

where i is an index for each one of the already acquired frames, i varying between p+1 and k, with k being the index of the current frame;

$GMV_i$ is the global motion value of the pair of frames comprised of the frames of indices i-1 and i, respectively;

d is the constant distance;

where p is comprised between 0 that is the index of a first acquired frame, and k that is the index of the current frame.

These embodiments enable to determine the first frame without impacting on available resources, as the determination in only based on comparisons and as the global motion values are progressively determined at each acquisition of a new frame.

In complement, the index p is stored to be used for a new determination of a new first frame upon reception of a new current frame.

This enables to accelerate the method when iterated as the index of the first frame can be used for a next acquired frame. Indeed, a new first frame for the new current frame is likely to be near to the previously determined first frame (depending on the variation of the global motion values).

According to some embodiments, the perspective transforms can be homographies and the global transform can be a composition of the perspective transforms of the pairs of frames that have been acquired between the first frame and the current frame.

This enables to easily compute the global transform to be used for the determination of the adapted first frame. Thus, the method according to the invention is not time consuming nor resource consuming.

A second aspect of the invention concerns a computer program product comprising a non-transitory computer readable medium having stored thereon computer program instructions loadable into a computing device and adapted to—when loaded into and executed by the computing device—cause the computing device to perform a method according to anyone of the embodiments of the first aspect of the invention.

A third aspect of the invention concerns a device for generating at least a first panoramic picture and a second panoramic picture based on a series of frames, the device comprising an acquisition unit adapted to acquire the series of frames while the device is panned in a main direction, a computing unit adapted to compute a global motion value and a perspective transform for each pair of consecutive frames of the series, the global motion value reflecting a displacement in the main direction between the frames of a pair of frames and the perspective transform reflecting a perspective change between the frames of a pair of frames. The device is further arranged to determine, for each frame of the series, a first area of the frame for the first panoramic picture and a second area of the frame, distinct from the first area, for the second panoramic picture. The device further comprises, upon acquisition of a current frame of the series of frames:

a first determination unit for determining a first frame among the already acquired frames of the series of frames, which has a second area that shares at least a common area with the first area of the current frame;

a calculation unit for calculating a global transform based on the perspective transforms of the pairs of consecutive frames that have been acquired between the first frame and the current frame;

a second determination unit for determining an adapted first area by applying an inverse of the global transform to the first area of the current frame, the adapted first area being included into the first panoramic picture and the second area of the current frame being included into the second panoramic picture.

According to some embodiments, the first and second areas are respectively a first strip and a second strip that are extending in a direction perpendicular to the main direction, centres of the first and second strips being located at constant positions in the frames and being separated by a constant distance from one frame to the other.

In complement, the device further comprises a comparison unit for comparing a sum of the global motion values of the pairs of consecutive frames of the series of frames with the constant distance. The first determination unit can then determine the first frame if the sum of the global motion values is greater than the constant distance.

Alternatively or in complement, the device can further comprise a generation unit for adding, if the sum of the global motion values is lower than the constant distance, the first strip of the current frame to the first panoramic picture and the second strip of the current frame to the second panoramic picture, and the device can be arranged to acquire at least one new frame, the new frame being added to the series to form a new series of frames, and to calculate a new global motion value between the current frame and the new frame to repeat the step of comparing a sum of the global motion values for each pair of consecutive frames of the new series with the constant distance.

Alternatively or in complement, the device is arranged to determine a width of the first and second strips of a given frame, which is proportional to the global motion value of the pair of frames comprised of the given frame and the previous frame acquired before the given frame.

According to some embodiments of the invention, the first determination unit determines the first frame as being the frame of index p for which the absolute value of the following expression is minimized:

$$(\Sigma_{i\in[p+1;k]}GMV_i)-d$$

where i is an index for each one of the already acquired frames, i varying between p+1 and k, with k being the index of the current frame;

GMVi is the global motion value of the pair of frames comprised of the frames of indices i−1 and i, respectively;

d is the constant distance;

where p is comprised between 0 that is the index of a first acquired frame, and k that is the index of the current frame.

In complement, the device can further comprise a memory to store the index p to be used for a new determination of a new first frame upon reception of a new current frame.

In some embodiments, the perspective transforms are homographies and the calculation unit calculates the global transform as a composition of the perspective transforms of the pairs of consecutive frames that have been acquired between the first frame and the current frame.

BRIEF DESCRIPTION OF THE DRAWINGS

Embodiments of the present invention are illustrated by way of example, and not by way of limitation, in the figures of the accompanying drawings, in which like reference numerals refer to similar elements and in which.

DESCRIPTION OF PREFERRED EMBODIMENTS

Figure 1:
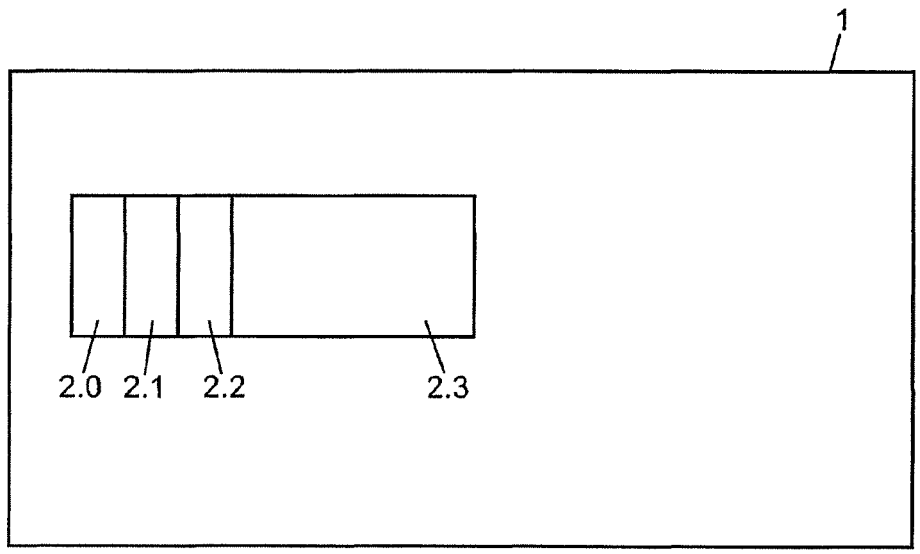
FIG. 1 illustrates a panoramic picture comprising a series of frames that have been captured by a single camera.

Referring to FIG. 1, there is shown a panoramic picture 1 comprising a series of frames that have been captured by a single camera. The frames may be still images that have been successively captured or frames that originate from a video sequence. In the present example, the panoramic picture 1 has a rectangular shape. However, no restriction is attached to the shape of the panoramic picture, which depends on what a user of the camera wants to create.

The series of frames comprises frames 2.0, 2.1, 2.2 and 2.3. In the example represented on FIG. 1, the frames have been recorded while the camera is panned from the left to the right. No restriction is attached to the direction and the sense in which the camera is panned (from the right to the left, from top to down, bottom-up, passing several times on the same view, coming back to a same view etc).

The frames 2.0-2.3 have been successively included into the panoramic picture 1 and superimposed in positions that depend on global motion vectors that can be calculated between pairs of frames. The positions can also be determined based on a comparison of contents of the two frames of a pair of frames. For the sake of simplicity, the global motion vectors of the pairs of frames 2.0-2.1; 2.1-2.2; 2.2-2.3, have been represented as perfectly horizontal. However, the movement of the camera can be more complex, either because a user of the camera wishes to record a more complex movement, or because of shivers (causing pitch and roll) in case of a hand-held camera. Thus, the panoramic picture 1 is not limited to a linear panoramic view, but may result from any movement of the camera.

Thus, by scanning a scene from left to right, one can create the panoramic picture 1. However, the frames 2.0-2.3 are not only positioned in the panoramic picture 1, as it will be further explained with reference to FIG. 2.

Figure 2:
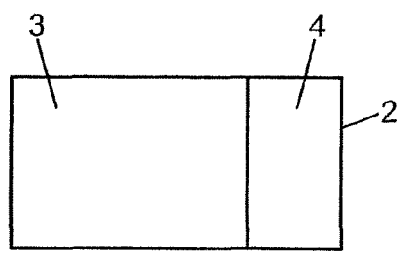
FIG. 2 represents a frame, which is divided in a mix area 3 and a copy area.

Referring now to FIG. 2, there is shown a frame 2, which is divided in a mix area 3 and a copy area 4. These areas 3 and 4 are defined before inserting the frame 2 in the panoramic picture 1 of FIG. 1 for example, so that the mix area 3 can be blended with a part of the frame that has been acquired before frame 2, and so that the copy area 4 can be directly copied in the panoramic picture 1. This principle can be used to create stereoscopic panoramic pictures from a single video, according to some methods of the prior art, by generating two panoramic pictures, for instance corresponding to left and right views, with a different positioning of the mix and copy areas 3 and 4, as it will be further detailed with reference to FIGS. 3a to 3c.

Figure 3A:
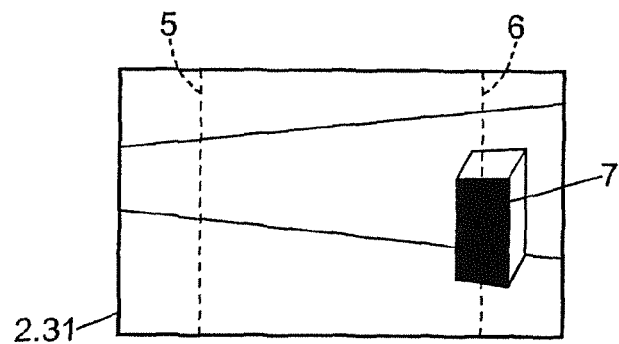
FIGS. 3a, 3b and 3c illustrate respectively three frames of a single scene acquired with a same camera from three different points of view, the camera being rotated from the left to the right.
Figure 3B:
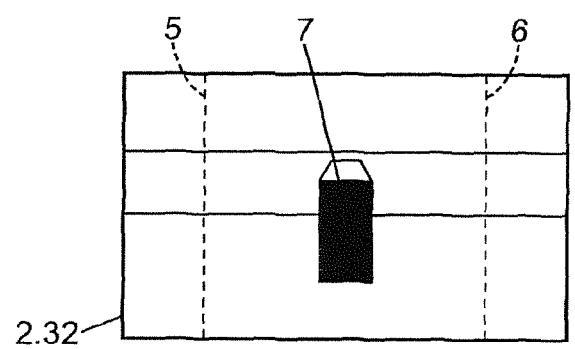
Figure 3C:
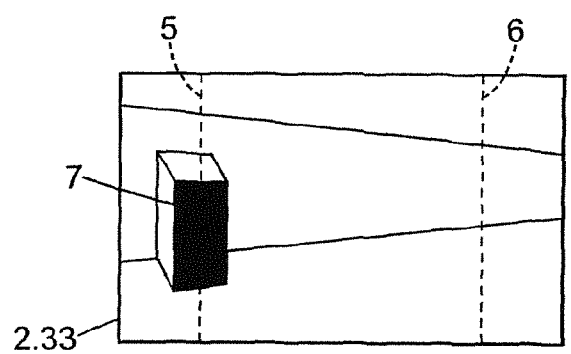

Referring to FIGS. 3a to 3c, there is respectively shown three frames 2.31, 2.32 and 2.33 of a single scene acquired with a unique camera from three different points of view, the camera being rotated from the left to the right.

Each of the frames 3a to 3b comprises a first position 5 and a second position 6. The first position 5, which is located on the left side of the frames, is used to determine strips of the frames to be added to a first panoramic picture, which is dedicated to the right eye. The second position 6, which is located on the right side of the frames, is used to determine strips of the frames to be added to a second panoramic picture, which is dedicated to the left eye. In this example, the strips would be vertical as the main movement of the camera is horizontal. However, to generate stereo panorama with vertical motion, the camera can be rotated by 90° or 270° and panned horizontally.

Thus, by generating two panoramic pictures, one from the perspective of a given eye of a virtual user, a three dimensional effect can be created. The first and second positions 5 and 6 can for example represent positions on which a first and a second determined strips are respectively centred, the first strip being dedicated to the first panoramic picture and the second strip being dedicated to the second panoramic picture. For the sake of simplicity, the strips have not been represented on FIGS. 3a to 3c, as the widths of the strips can vary. Indeed, the width of the strips of a given frame can for example be proportional to the projection of the global motion vector on a horizontal axis (if the desired movement of the camera is horizontal), hereafter called global motion value. This avoids losing information when the camera is panned too fast.

FIG. 3a represents the first frame 2.31 that has been acquired by the camera. The recorded frame 2.31 comprises an object 7, which belongs, at least partly, to the second strip centred on the second position 6.

FIG. 3b represents the second frame 2.32 that has been acquired by the camera, after the first frame 2.31. As the camera is rotated from the left to the right, the object 7 is now in the middle of the second frame 2.32.

FIG. 3c represents the third frame 2.33 that has been acquired by the camera, after the second frame 2.32. As the camera is panned from the left to the right, the object 7 is now comprised, at least partly, in the first strip centred on the first position 5.

Thus, according to the methods of the prior art, the object 7 will be integrated in the first panoramic picture by pasting the first strip of the third frame 2.33, taken according to a third point of view, whereas the object 7 will be integrated in the second panoramic picture by pasting the second strip of the first frame 2.31, taken according to a first point of view.

As it can be seen on FIGS. 3.a and 3.c, the first and third points of view are significantly different. Thus, the result of such deformations is that a final stereoscopic image, which is obtained based on the first and second panoramic pictures, will look distorted, unnatural and the depth effect may be difficult to perceive. The present invention enables to compensate for the perspective differences, as it will be explained with reference to FIG. 4.

Figure 4:
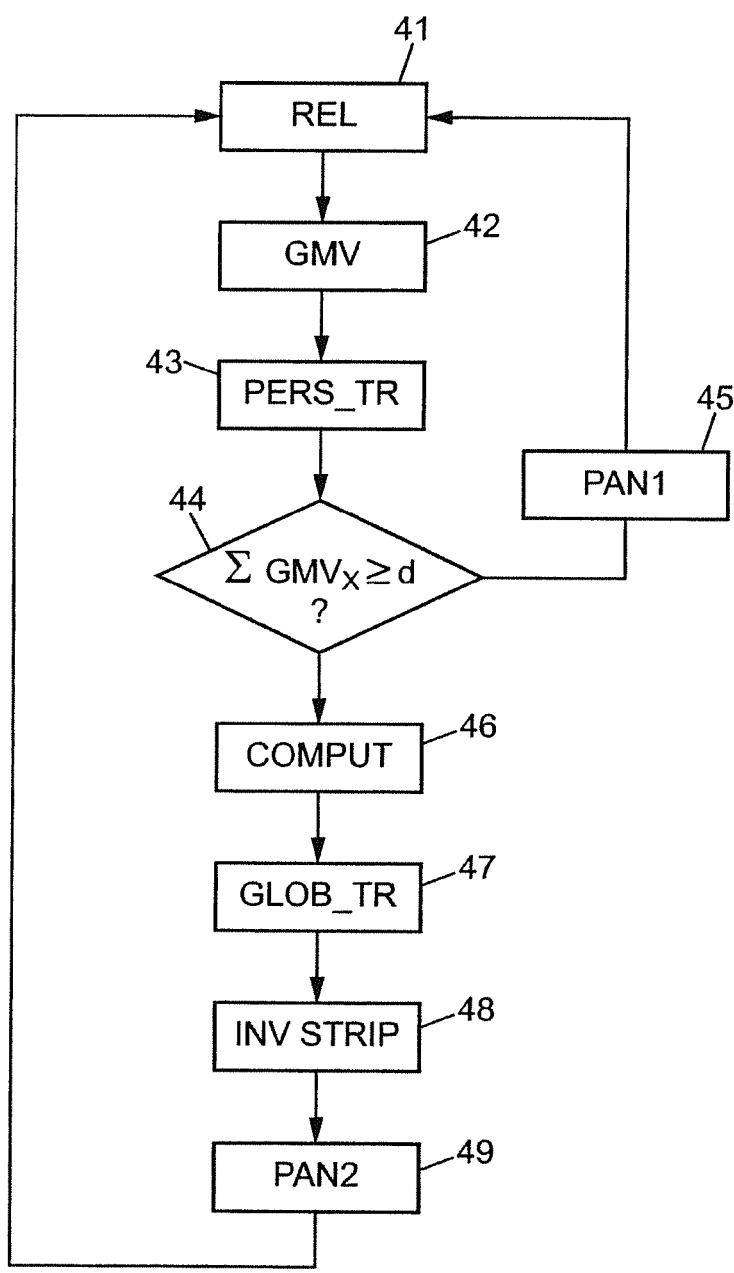
FIG. 4 illustrates a flowchart representing the steps of a method according to some embodiments of the invention.

Referring to FIG. 4, there is shown a flowchart representing the steps of a method according to some embodiments of the invention.

Initially, a constant distance d between the first and second positions 5 and 6 can be prefixed. It is to be noted that when d is fixed to a high value (meaning that the first and second positions are near to the left and right edges of the frames, respectively), the 3D effect is important. The constant distance d between the first and second positions 5 and 6 corresponds to a virtual spacing between a similar system comprising two cameras, each camera generating a panoramic picture. However, the present invention enables to obtain similar results with a single camera.

At step 41, a frame $I_k$ is acquired by the camera, k being an index. For example, $I_0$ refers to the first frame that has been acquired by the camera.

For each incoming frame $I_k$, a global motion vector $GMV_k$ can be computed at step 42. The global motion vector can be representative of the global motion between frame $I_{k-1}$ and frame $I_k$. In the following, by considering that the movement of the camera is horizontal from the left to the right, we consider the projection of the $GMV_k$ on an horizontal axis, the value of the projection being called global motion value and being noted $GMV_{X,k}$ in what follows. For each frame Ik, the global motion value $GMV_{X,k}$ can be stored. It is to be noted that instead of being associated to a given frame, the global motion value of this frame can be associated to the pair of frames comprising the given frame and the frame acquired directly before the given frame.

At step 42, a perspective transform $H_k$ is computed for the frame $I_k$. The perspective transform can be a homography that can be computed based on a list of pixel correspondences in frames $I_{k-1}$ and $I_k$ (i.e. points that correspond to the same features in both frames). The following set of equations can then be solved:

$$F_k = H_k \cdot F_{k-1}$$

where $H_k$ is a 3*3 matrix, $F_k$ is a vector representing frame $I_k$, and $F_{k-1}$ is a vector representing frame $I_{k-1}$.

For example, $F_{k-1}$ can be the vector (x, y, 1), where x and y are the coordinates of a given pixel in the frame $I_{k-1}$, and $F_k$ is the vector (x', y', z'), where x'/z' and y'/z' are the coordinates of the pixel of frame $I_k$ that corresponds to the given pixel in the frame $I_{k-1}$.

Based on these coordinates, the non linear set of equations can be solved by conventional computer vision methods for example.

These pixel correspondences can be computed in several ways. For example, the global motion vector may have been determined by a classical block matching algorithm, whose local motion vectors can be re-used.

For each frame $I_k$, the perspective transform $H_k$ can then be stored.

At step 44, it is then determined whether the sum of the global motion values of all the frames that have been acquired (meaning the frames that are comprised between the frame $I_0$ and the frame $I_k$) is greater than or equal to the constant distance d.

If this is not the case, a first strip centred on the first position of frame $I_k$ and a second strip centred on the second position of frame $I_k$ are taken from the frame $I_k$ to be pasted respectively in the first and second panoramic pictures, at step 45. The method is then iterated by coming back to step 41.

Else, at step 46, it is determined which frame $I_p$, p being comprised between 0 and k, has a second strip at the same position (meaning at the same physical position in the recorded scene) as the first strip of the current frame $I_k$. Of course, if the camera is panned from the right to the left, it is determined which frame $I_p$, p being comprised between 0 and k, has a first strip at the same position as the second strip of the current frame $I_k$. This will be better comprised by referring to FIGS. 5a, 5b and 5c.

Figure 5A:
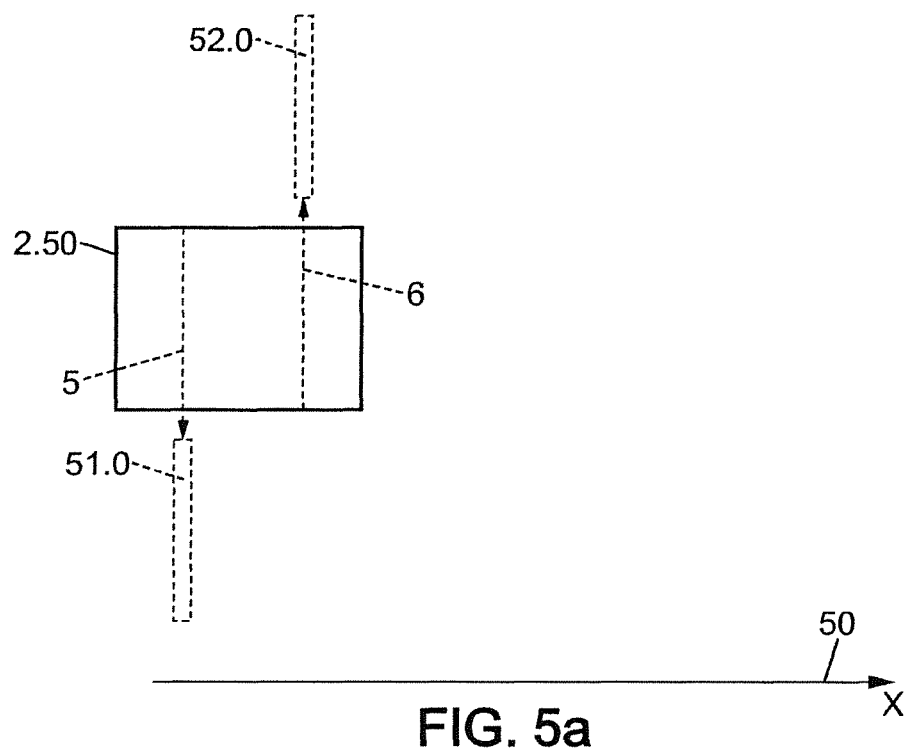
FIGS. 5a, 5b and 5c represent the construction of first and second panoramic pictures at different steps of a method according to some embodiments of the invention.
Figure 5B:
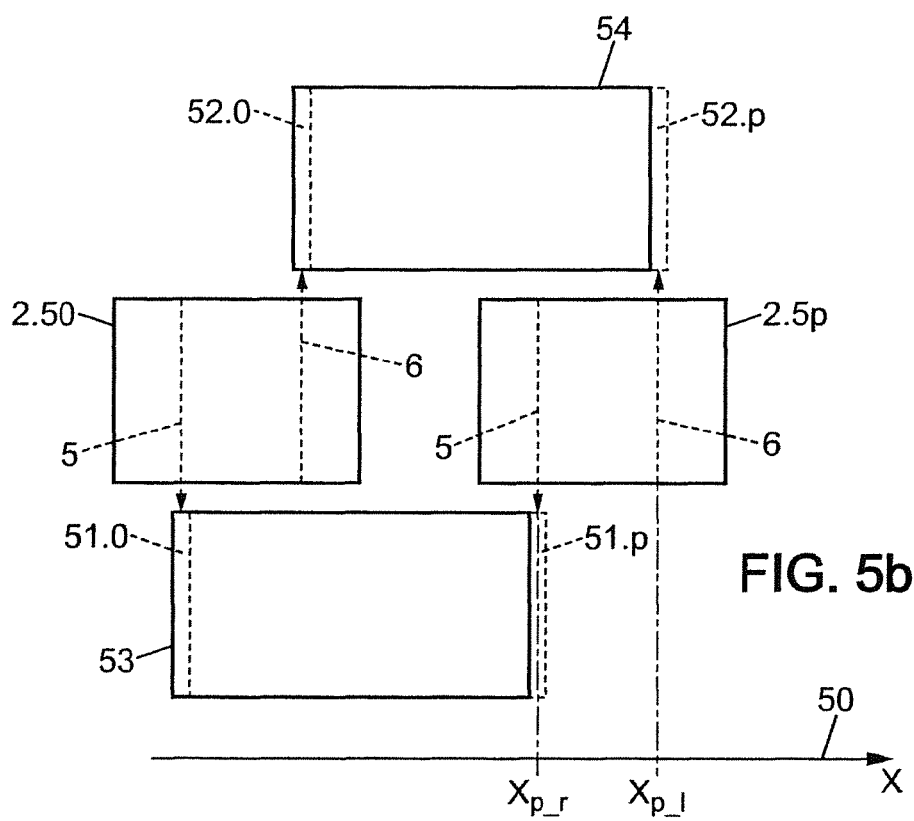
Figure 5C:
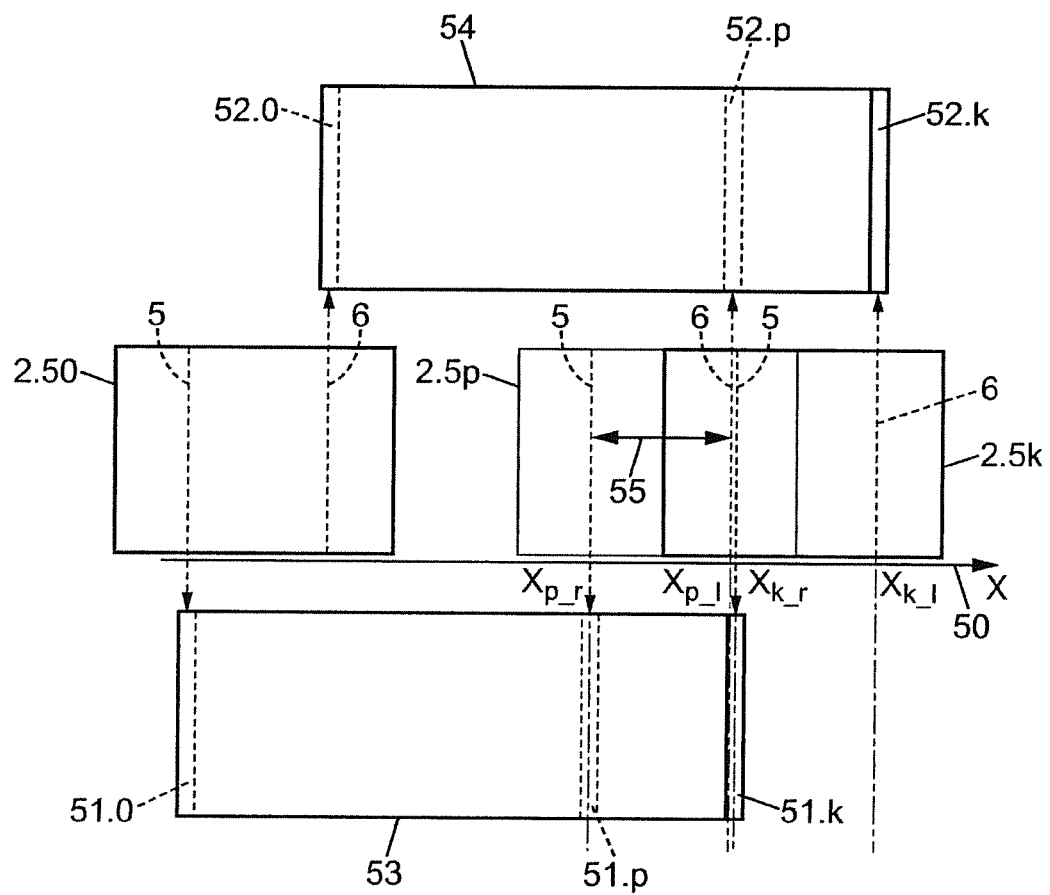

In order to identify the movement of the camera, and thus of the acquired frame, a horizontal axis 50 is represented on FIGS. 5a, 5b and 5c.

Referring to FIG. 5a, there is shown the construction of first and second panoramic pictures at the beginning of a method according to some embodiments of the invention, when the first frame $I_0$, referenced 2.50, has been acquired by the camera. A first strip 51.0 is determined around the first position 5 and a second strip 52.0 is determined around the second position 6. As no global motion vector has been computed for the first frame $I_0$ 2.50, the width of the first and second strips 51.0-52.0 can be fixed to a default value.

Referring now to FIG. 5b, there is shown the construction of first and second panoramic pictures after the acquisition of p+1 frames by the camera, according to some embodiments of the invention. Only frames $I_0$ and $I_p$ have been represented for the sake of clarity. Frame $I_p$ is referenced 2.5p. As the camera is panned from the left to the right, frame $I_p$ is shifted to the right compared to frame $I_0$. A first strip 51.p of frame $I_p$ is added to the first panoramic picture, which is referenced first panoramic picture 53. The first strip 51.p of frame $I_p$ is centred on the first position 5. A second strip 52.p of frame $I_p$ is added to the second panoramic picture, which is referenced second panoramic picture 54. The second strip 52.p of frame $I_p$ is centred on the second position 6 of frame $I_p$. As already explained, the width of the first and second strips 51.p-52.p can be proportional to the global motion value $GMV_{X,p}$ of frame $I_p$. The abscissa (obtained by projection on the axis 50) of the first position 5 of frame $I_p$ is noted $x_{p\_r}$. The abscissa of the second position 6 of frame $I_p$ is noted $x_{p\_l}$.

Referring now to FIG. 5c, there is shown the construction of first and second panoramic pictures 53-54, after the acquisition of k+1 frames by the camera, according to some embodiments of the invention. Only frames $I_0$, $I_p$ and $I_k$ have been represented for the sake of clarity. Frame $I_k$ is referenced 2.5k. As the camera is panned from the left to the right, frame $I_k$ is shifted to the right compared to frame $I_p$. A first strip 51.k of frame $I_k$ is added to the first panoramic picture 53. The first strip 51.k of frame $I_k$ is centred on the first position 5. A second strip 52.k of frame $I_k$ is added to the second panoramic picture 54. The second strip 52.k of frame $I_k$ is centred on the second position 6 of frame $I_k$. As already explained, the width of the first and second strips 51.k-52.k can be proportional to the global motion value $GMV_{X,k}$ of frame $I_k$. The abscissa (obtained by projection on the axis 50) of the first position 5 of frame $I_k$ is noted $x_{k\_r}$. The abscissa of the second position 6 of frame $I_k$ is noted $x_{k\_l}$. As already explained, the constant distance d, referenced 55, between the first and second positions 5 and 6 of a given frame, is held constant.

On FIG. 5c, it can be seen that $x_{k\_r}$ and $x_{p\_l}$ are very near, that is to say that the second strip 52.p of the frame $I_p$ covers approximately the same scene content as the first strip 51.k of frame $I_k$.

Referring back to FIG. 4, index p can be determined at step 46 such that p is the index for which the absolute value of the difference between $x_{k\_r}$ and $x_{p\_l}$ is minimal. It is to be noted that it is not always possible to find p such that $x_{p\_l}$ is equal to $x_{k\_r}$, in spite of d being constant, because the motion of the camera is discrete and under the control of the user of the camera.

The difference between $x_{k\_r}$ and $x_{p\_l}$ can be rewritten based on the global motion values $GMV_{X,i}$ of the frames:

$$x_{k\_r} - x_{p\_l} = (\Sigma_{i \in [p+1;k]} GMV_{X,i}) - d$$

The minimization of the absolute value of $x_{k\_r} - x_{p\_l}$ can thus be performed very simply by scanning the previously acquired frames and by cumulating and storing the global motion values sequentially backward, starting from the current picture $I_k$, then k−1, until reaching a value $p_1$ for which the sum of the global motion values becomes greater than d. Then, p is made equal to $p_1$ or to $p_1+1$, depending on which one of the two gives the smallest absolute value for the difference $x_{k\_r} - x_{p\_l}$.

No restriction is attached to the way frame $I_p$ is determined. Indeed, other strategies can be thought for frame $I_p$ identification (for example storing the result p for frame $I_k$ in order to accelerate the search for a new frame $I_{k+1}$), which do not preclude the principle of the present invention.

At step 47, a global transform $H_{p \to k}$ between the frame $I_p$ and the frame $I_k$ is determined based on the perspective transforms $H_i$ (which are homographies in this particular example) of the frames comprised between the frames $I_p$ and $I_k$. This can be done without storing the intermediate frames, by multiplying the homographies according to the following formula:

$$H_{p \to k} = H_k * H_{k-1} * \ldots * H_{p+1};$$

Thus, it is ensured hat the memory requirements of the method according to the present invention are not significantly higher than conventional methods, because every homography is a 3*3 matrix.

The global transform $H_{p \to k}$ is the perspective transform that puts the frame $I_p$ in the same virtual point of view as the current frame $I_k$. To generate the first panoramic picture 53 according to the invention, the first strip 51.k of the current frame $I_k$ should be put in the same point of view as the second strip 52.p of the frame $I_p$.

To this purpose, at step 48, the inverse of the global transform $H_{p \to k}$ is calculated and applied to the first strip 51.k of the current frame $I_k$ to obtain an adapted first strip.

At step 49, the second strip 52.k and the adapted first strip of the current frame $I_k$ are respectively added to the second panoramic picture 54 and to the first panoramic picture 53. The method can then be iterated by coming back to step 41 upon acquisition of a new frame $I_{k+1}$.

Figure 6:
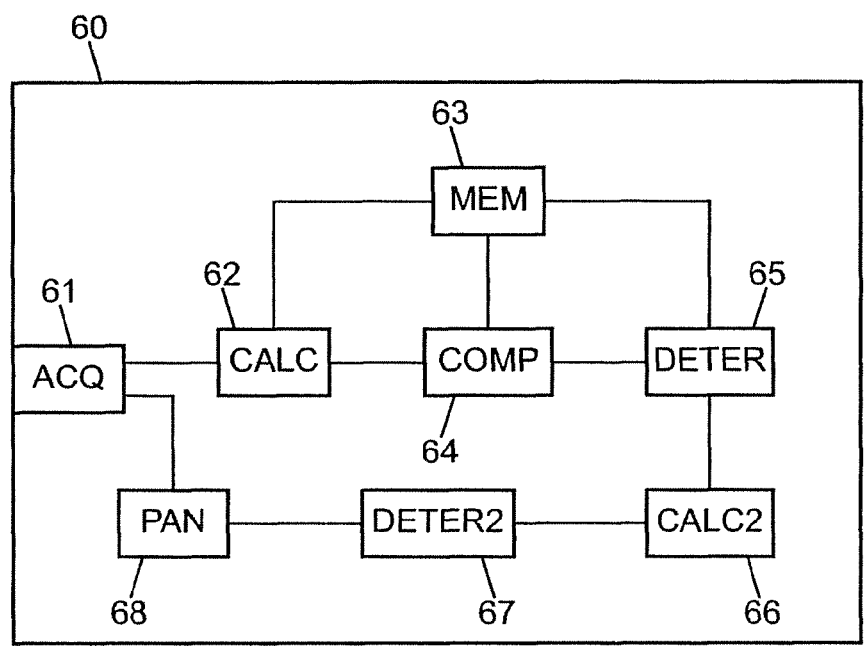
FIG. 6 illustrates a device according to some embodiments of the invention.

Referring to FIG. 6, there is a shown a device 60 according to some embodiments of the invention.

The device 60 comprises an acquisition unit 61 that is adapted to acquire frames. The device 60 further comprises a first calculation unit 62 that is adapted to perform the steps 42 and 43 that are illustrated on FIG. 4, in order to determine the global motion value $GMV_{X,k}$ and the perspective transform $H_k$ of the current frame $I_k$. The global motion value $GMV_{X,k}$ and the perspective transform $H_k$ can then be stored in a memory 63. The device 60 further comprises a comparison unit 64 that is adapted to perform the step 44 illustrated on FIG. 4, in order to determine whether the sum of the global motion values of all the frames that have been acquired is less than the constant distance d.

The device 60 comprises a first determination unit 65 that is adapted to perform the step 46 illustrated on FIG. 4, in order to determine which frame $I_p$, p being comprised between 0 and k, has a second strip 52.p at the same position as the first strip 51.k of the current frame $I_k$.

The device 60 further comprises a second calculation unit 66 to perform the step 47 illustrated on FIG. 4, in order to determine the global transform $H_{p \to k}$, and a second determination unit 67 adapted to perform the step 48 illustrated on FIG. 4, in order to determine an adapted first strip. The device also comprises a generating unit 68 to generate the first panoramic picture by adding the second strip 52.k and the adapted first strip of the current frame $I_k$ and also to perform step 45 illustrated on the FIG. 4.

Thus, the present invention enables to compensate for the perspective differences between corresponding strips dedicated to the first and second panoramic pictures. In this way, first and second panoramic pictures are generated with virtual cameras having the same orientation, without impacting the memory requirements of the algorithm and its complexity.

Embodiments of the present invention can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Embodiments of the invention have been described above in detail with reference to embodiments thereof. However, as is readily understood by those skilled in the art, other embodiments are equally possible within the scope of the present invention, as defined by the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, some embodiments of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A method of generating at least a first panoramic picture and a second panoramic picture based on a series of frames acquired by one frame acquisition device while the device is panned in a main direction, the method comprising:
   computing via the device, a global motion value and a perspective transform for each pair of consecutive frames of the series, said global motion value reflecting a displacement in the main direction between the frames of the pair of frames and said perspective transform reflecting a perspective change between the frames of the pair of frames;
   for each frame of the series, determining via the device, a first area of the frame for the first panoramic picture and a second area of the frame, distinct from the first area, for the second panoramic picture; and
   when a current frame of the series of frames is acquired:
      determining via the device, a first frame among the already acquired frames of the series of frames, which has a second area that shares at least a common area with the first area of the current frame,
      calculating via the device, a global transform based on the perspective transforms of the pairs of consecutive frames that have been acquired between the first frame and the current frame, and
      determining via the device, an adapted first area by applying an inverse of the global transform to the first area of the current frame, said adapted first area being included into the first panoramic picture and the second area of the current frame being included into the second panoramic picture,
   wherein the first and second areas are respectively a first strip and a second strip that are extending in a direction perpendicular to the main direction, centers of said first and second strips being located at constant positions in the frames and being separated by a constant distance from one frame to the other,
   wherein the method further comprises
      before determining the first frame, comparing a sum of the global motion values of the pairs of consecutive frames of the series of frames with said constant distance,
      wherein the step of determining the first frame is performed only if the sum of the global motion values is greater than the constant distance.

2. The method of claim 1, wherein
   if the sum of the global motion values is lower than the constant distance, then the first strip of the current frame is included into the first panoramic picture and the second strip of the current frame is included into the second panoramic picture, and
   the method further comprises acquiring at least one new frame, said new frame being added to the series to form a new series of frames, and calculating a new global motion value between the current frame and the new frame to repeat the step of comparing a sum of the global motion values for each pair of consecutive frames of the new series with the constant distance.

3. The method according to claim 1, wherein a width of the first and second strips of a given frame is proportional to the global motion value of the pair of frames comprised of said given frame and the previous frame acquired before the given frame.

4. The method according to claim 1, wherein the first frame is determined as being a frame of index p for which an absolute value of following expression is minimized:

$$(\Sigma_{i\in[p+1;k]}GMV_i)-d$$

where i is an index for each one of the already acquired frames, i varying between p+1 and k, with k being an index of the current frame, $GMV_i$ is the global motion value of the pair of frames comprised of the frames of indices i−1 and l, respectively, d is the constant distance, and p is between 0 that is an index of a first acquired frame, and k that is the index of the current frame.

5. The method according to claim 1, wherein the perspective transforms are homographies and the global transform is a composition of the perspective transforms of the pairs of consecutive frames that have been acquired between the first frame and the current frame.

6. A non-transitory computer readable medium having stored thereon computer program instructions loadable into a computing device, which when the program instructions loaded and executed performs a method according to claim 1.

7. A device for generating at least a first panoramic picture and a second panoramic picture based on a series of frames, said device comprising:
   an input operative to acquire said series of frames while said device is panned in a main direction; and
   a computer coupled to the input and being operative to:
      compute a global motion value and a perspective transform for each pair of consecutive frames of the series, said global motion value reflecting a displacement in the main direction between the frames of the pair of frames and said perspective transform reflecting a perspective change between the frames of the pair of frames;

determine, for each frame of the series, a first area of the frame for the first panoramic picture and a second area of the frame, distinct from the first area, for the second panoramic picture;

determine, upon acquisition of a current frame of the series of frames, a first frame among the already acquired frames of the series of frames, which has a second area that shares at least a common area with the first area of the current frame;

calculate a global transform based on the perspective transforms of the pairs of consecutive frames that have been acquired between the first frame and the current frame; and determine an adapted first area by applying an inverse of the global transform to the first area of the current frame, said adapted first area being included into the first panoramic picture and the second area of the current frame being included into the second panoramic picture, wherein the first and second areas are respectively a first strip and a second strip that are extending in a direction perpendicular to the main direction, centers of said first and second strips being located at constant positions in the frames and being separated by a constant distance from one frame to the other, wherein the computer is further operative to compare a sum of the global motion values of the pairs of consecutive frames of the series of frames with said constant distance, wherein the computer determines the first frame if the sum of the global motion values is greater than the constant distance.

8. The device according to claim 7, wherein if the sum of the global motion values is lower than the constant distance, the computer includes the first strip of the current frame into the first panoramic picture and the second strip of the current frame into the second panoramic picture, and wherein the device is arranged to acquire at least one new frame, said new frame being added to the series to form a new series of frames, and to calculate a new global motion value between the current frame and the new frame to repeat the step of comparing a sum of the global motion values for each pair of consecutive frames of the new series with the constant distance.

9. The device according to claim 7, wherein the device is arranged to determine a width of the first and second strips of a given frame, which is proportional to the global motion value of the pair of frames comprised of said given frame and the previous frame acquired before the given frame.

10. The device according to claim 7, wherein the computer determines the first frame as being a frame of index p for which an absolute value of following expression is minimized:

$$(\Sigma_{i \in [p+1;k]} GMV_i) - d$$

where i is an index for each one of the already acquired frames, i varying between p+1 and k, with k being an index of the current frame, $GMV_i$ is the global motion value of the pair of frames comprised of the frames of indices i−1 and l, respectively, d is the constant distance, and p is between 1 that is an index of a first acquired frame, and k that is the index of the current frame.

11. The device according to claim 7, wherein the perspective transforms are homographies and the computer calculates the global transform as a composition of the perspective transforms of the pairs of consecutive frames that have been acquired between the first frame and the current frame.

* * * * *